US008262939B2

(12) United States Patent
Kim et al.

(10) Patent No.: US 8,262,939 B2
(45) Date of Patent: Sep. 11, 2012

(54) THERMOPLASTIC NANOCOMPOSITE RESIN COMPOSITE MATERIALS

(75) Inventors: Il Jin Kim, Gunpo-si (KR); O Sung Kwon, Gunpo-si (KR); Jae Bum Park, Incheongwangyeok-si (KR)

(73) Assignee: Cheil Industries Inc., Gumi-si (KR)

( * ) Notice: Subject to any disclaimer, the term of this patent is extended or adjusted under 35 U.S.C. 154(b) by 39 days.

(21) Appl. No.: 11/477,758

(22) Filed: Jun. 29, 2006

(65) Prior Publication Data
US 2010/0249272 A1    Sep. 30, 2010

(30) Foreign Application Priority Data

Dec. 30, 2005   (KR) ........................ 10-2005-0135079

(51) Int. Cl.
*H01B 1/00*    (2006.01)
(52) U.S. Cl. ........ 252/500; 385/129; 428/447; 524/430; 524/832; 525/64
(58) Field of Classification Search .................. 252/500; 435/6; 523/209, 210; 428/447; 524/832, 524/430; 525/64; 385/129
See application file for complete search history.

(56) References Cited

U.S. PATENT DOCUMENTS

| | | | |
|---|---|---|---|
| 4,141,932 A | 2/1979 | Butler | |
| 5,071,910 A | 12/1991 | Schepers et al. | |
| 5,160,452 A | 11/1992 | Marutsuka et al. | |
| 5,218,014 A * | 6/1993 | Matsumoto et al. | 523/209 |
| 5,258,435 A | 11/1993 | Huggins et al. | |
| 5,543,460 A * | 8/1996 | Yamamoto et al. | 525/64 |
| 5,614,568 A | 3/1997 | Mawatari et al. | |
| 5,705,540 A * | 1/1998 | Uchida et al. | 523/210 |
| 5,856,379 A * | 1/1999 | Shiratsuchi et al. | 523/209 |
| 6,133,360 A | 10/2000 | Barren et al. | |
| 6,566,456 B1 | 5/2003 | Yang et al. | |
| 6,586,483 B2 * | 7/2003 | Kolb et al. | 521/91 |
| 6,599,631 B2 * | 7/2003 | Kambe et al. | 428/447 |
| 6,656,990 B2 * | 12/2003 | Shustack et al. | 524/430 |
| 6,673,458 B2 | 1/2004 | Mager et al. | |
| 6,759,452 B2 | 7/2004 | Border et al. | |
| 6,794,448 B2 * | 9/2004 | Sakuma | 524/832 |
| 6,933,327 B2 | 8/2005 | Yamakawa et al. | |
| 6,995,196 B2 | 2/2006 | Higuchi et al. | |
| 7,473,721 B2 | 1/2009 | Harada et al. | |
| 7,479,516 B2 | 1/2009 | Chen et al. | |

(Continued)

FOREIGN PATENT DOCUMENTS

JP    62-89701 A    4/1987
(Continued)

OTHER PUBLICATIONS

International Search Report issued in Application No. PCT/KR2006/002507 on Oct. 2, 2006.

(Continued)

*Primary Examiner* — Khanh Tuan Nguyen
(74) *Attorney, Agent, or Firm* — Summa, Additon & Ashe, P.A.

(57) ABSTRACT

A polymer composite material includes metal (oxide) nanoparticles chemically bonded to a vinyl polymer. Some embodiments may additionally comprise thermoplastic resin through which the nanoparticles and vinyl polymer are dispersed. In some embodiments, the composite materials have improved impact strength, tensile strength, heat resistance, and flexural modulus.

14 Claims, 2 Drawing Sheets

U.S. PATENT DOCUMENTS

| | | | |
|---|---|---|---|
| 2002/0123550 A1 | | 9/2002 | Border et al. |
| 2003/0021566 A1* | | 1/2003 | Shustack et al. ............ 385/129 |
| 2003/0174994 A1 | | 9/2003 | Garito et al. |
| 2007/0049678 A1 | | 3/2007 | Kim et al. |
| 2007/0172834 A1* | | 7/2007 | Englebienne et al. ............ 435/6 |
| 2009/0298991 A1 | | 12/2009 | Kwon et al. |

FOREIGN PATENT DOCUMENTS

| | | | |
|---|---|---|---|
| JP | 01-178558 | * | 7/1989 |
| JP | 2-34602 A | | 2/1990 |
| JP | 4-16518 A | | 1/1992 |
| JP | 4-18453 A | | 1/1992 |
| JP | 08-325340 | | 12/1996 |
| JP | 2002-255721 A | | 9/2002 |
| JP | 2002-322208 A | | 11/2002 |
| JP | 2004-509985 | | 4/2004 |
| JP | 2004189814 A | | 7/2004 |
| KR | 10-2004-0056559 A | | 7/2004 |
| KR | 10-0717514 B1 | | 5/2007 |
| TW | 518354 B | | 1/2003 |
| TW | 531549 B | | 5/2003 |
| TW | 200301770 | | 7/2003 |
| WO | 02/08321 A1 | | 1/2002 |
| WO | 02/24758 | | 3/2002 |
| WO | 03/016404 A1 | | 2/2003 |
| WO | 2004/106420 A2 | | 12/2004 |
| WO | 2005/036563 A2 | | 4/2005 |
| WO | 20071024043 A1 | | 3/2007 |
| WO | 2007/078038 A | | 7/2007 |
| WO | 2008/082225 A1 | | 7/2008 |

OTHER PUBLICATIONS

International Search Report in commonly owned International Application No. PCT/KR2005/004496, mailed on May 24, 2006.

Written Opinion in commonly owned International Application No. PCT/KR2005/004496, mailed on May 24, 2006.

Liu et al., In situ chemical oxidative graft polymerization of aniline from silica nanoparticles, Materials Chemistry and Physics, 87:109-113 (2004).

Rong et al., Structure-property relationships of irradiation grafted nano-inorganic particle filled polypropylene composites, Polymer, 42:167-183 (2001).

Office Action in commonly owned U.S. Appl. No. 11/487,794, mailed on Mar. 5, 2009.

International Preliminary Report on Patentability in counterpart International Application No. PCT/KR2006/002507, issued on Jul. 1, 2008.

International Preliminary Report on Patentability in Commonly owned Internatinal Application No. PCT/KR2005/004496, issued on Feb. 26, 2008.

Office Action in commonly owned U.S. Appl. No. 11/487,794, mailed on Jan. 19, 2010.

Rong et al., "Structure-property relationships of irradiation grafted nano-inorganic particle filled polypropylene composites," Polymer 42 (2001) pp. 167-183.

International Preliminary Report on Patentability in commonly owned International Application No. PCT/KR2007/006996, dated Jun. 30, 2009.

International Search Report in commonly owned International Application No. PCT/KR2007/006996, mailed on Apr. 4, 2008.

Chinese Office Action in counterpart Chinese Application No. 200680047158.8, mailed Nov. 20, 2009.

English translation of Chinese Office Action in counterpart Chinese Application No. 200680047158.8, mailed Nov. 20, 2009.

Supplementary European Search Report in counterpart European Application No. 06757739, dated Dec. 21, 2009.

Rong et al., "Graft polymerization of vinyl monomers onto nanosized alumina particles," European Polymer Journal 38 (2002) pp. 1573-1582.

Chinese Office Action in counterpart Chinese Application No. 200680047158.8 dated May 5, 2010.

English translation of Chinese Office Action in counterpart Chinese Application No. 200680047158.8 dated May 5, 2010.

English translation of Taiwanese Office Action in commonly owned Taiwanese Application No. 95121147, dated Sep. 8, 2009.

Office Action in commonly owned U.S. Appl. No. 12/479,000 dated May 11, 2011, pp. 1-9.

Final Office Action in commonly owned U.S. Appl. No. 12/479,000, mailed on Oct. 17, 2011, pp. 1-9.

Office Action in commonly owned U.S. Appl. No. 11/487,794, mailed Sep. 21, 2011, pp. 1-13.

* cited by examiner

THERMOPLASTIC NANOCOMPOSITE RESIN COMPOSITE MATERIALS

CROSS-REFERENCE TO RELATED APPLICATIONS

This non-provisional application claims priority under 35 U.S.C. §119(a) to Korean Patent Application No. 2005-135079 filed on Dec. 30, 2005, which is herein incorporated by reference.

BACKGROUND OF THE INVENTION

1. Field of the Invention

The present invention relates to modified nanoparticles in combination with polymers.

2. Description of the Related Technology

Thermoplastic resins are widely used because of their light weight and excellent moldability. However, thermoplastic resins may have poor thermal resistance, abrasion resistance and rigidity. In recent years, there has been a continuing effort to develop thermoplastic materials with improved physical properties. Specifically, research has focused on the creation of a highly moldable thermoplastic resin with good thermal resistance, abrasion resistance, modulus and rigidity.

One method of improving mechanical properties of thermoplastic resins includes adding inorganic fillers such as glass fiber, talc, and mica. However, resin composite materials prepared by blending inorganic filler and a thermoplastic resin lack a sufficient reinforcing effect because the bonding strength between the inorganic filler and the matrix resin is weak. Further, large amounts of inorganic filler may cause serious deterioration of impact strength.

In recent years, research has also focused on the effects of metal nanoparticles on different materials. Dispersion of very small metal particles in polymeric matrices is scientifically and technologically important for a variety of reasons. The preparation of nanoscale materials with unique properties represents a significant challenge. One potential advantage of a dispersed particle system is that many of its properties are strongly dependent on the interfacial properties of the materials because the fraction of the overall materials, which is in the vicinity of the fraction of an interface, is quite high. In addition to simply providing a large interfacial area, dispersions of very small inorganic particles may have useful electronic, optical, magnetic, chemical, catalytic and unique mechanical properties.

SUMMARY OF THE INVENTION

Described herein are composite materials comprising metal (oxide) nanoparticles and at least one vinyl polymer. In some embodiments, the vinyl polymer is a polymer one or more monomers selected from the group consisting of an aromatic vinyl monomer, a vinyl cyanide monomer, and an acrylic monomer.

As described herein, at least some of the metal (oxide) nanoparticles are chemically bonded to at least a part of the vinyl polymer. In some embodiments, the vinyl polymer is grafted on the surface of the metal (oxide) nanoparticles. In some embodiments, the metal (oxide) nanoparticles are chemically modified to include a function group that is capable of bonding with the vinyl polymer.

In one particular embodiment, the metal (oxide) nanoparticles comprises the following formula (I):

$$M(OSiR_3)_x \quad \text{(I)}$$

In the formula (I), M is a metal. In some embodiments, the metal is selected from the group consisting of silicon, aluminum, titanium, tin, iron, zinc, magnesium, zirconium, cerium, lithium, silver, antimony and nickel.

In the formula (I), R may be one or more selected from the group consisting of hydrogen, alkyl, alkoxy, and siloxy. In addition, R may also represent repeating alkoxysilane groups. In some embodiments, the repeating silicon and other metals (depending on the nanoparticles) are repeated to make a polymeric matrix comprising the metal (oxide) nanoparticle with the functional group.

In the formula (I), x may be 0, 1, 2, 3, or 4.

In some embodiments, the metal (oxide) nanoparticles are substantially uniformly dispersed in a matrix comprising the vinyl polymer. In some embodiments, the metal (oxide) nanoparticles are modified as to have a functional group and be hydrophobic. In some embodiments, the hydrophobicity prevents aggregation of the nanoparticles in the vinyl polymer matrix. In some embodiments, the composite material comprises a graft polymer of the vinyl polymer and the metal (oxide) nanoparticles.

In some embodiments, a vinyl polymer is a copolymer of a) one or more of the aromatic vinyl monomer, the vinyl cyanide monomer, and the acrylic monomer, and b) an imide. In certain embodiments, the imide is one or more selected from the group consisting of maleimide, N-methyl maleimide, N-phenyl maleimide and acrylimide.

In some embodiments, the composite material comprises about 1 to about 99 parts by weight of a thermoplastic resin, based on the metal (oxide) nanoparticles and the vinyl polymer totaling 100 parts by weight. In certain of these embodiments, the thermoplastic resin comprises one or more selected from acrylonitrile-butadiene-styrene copolymer (ABS); acrylonitrile-acrylic rubber styrene copolymer resin (AAS), acrylonitrile-ethylenepropylene rubber-styrene copolymer resin, and acrylonitrile-styrene copolymer (SAN) resin. In a few embodiments, the thermoplastic resin is a graft-ABS resin.

In certain embodiments, the composite material comprises about 25 parts by weight of the graft-ABS resin, about 0.1 to about 10 parts by weight of the metal(oxide) nanoparticles, and about 65 to about 74.9 parts by weight of the vinyl polymer. In some of these embodiments, the vinyl polymer is a styrene-acrylonitrile copolymer and the metal (oxide) nanoparticles are chemically bonded to the styrene-acrylonitrile copolymer.

In certain embodiments comprising the thermoplastic resin, the metal (oxide) nanoparticles, and the vinyl polymer, the composite material has improved physical, mechanical, and chemical properties. One embodiment of the composite material has impact strength greater than or equal to about 21 kgf·cm/cm when a specimen of the material is tested under the standard ASTM D-256 (¼" notched) at 23° C. Another embodiments of the composite material has impact strength greater than or equal to about 23 kgf·cm/cm when a specimen of the material is tested under the standard ASTM D-256 (¼" notched) at 23° C. In yet another embodiment, the composite material has impact strength greater than or equal to about 24 kgf·cm/cm when a specimen of the material is tested under the standard ASTM D-256 (⅛" notched) at 23° C. In some embodiments, the composite material has impact strength greater than or equal to about 27 kgf·cm/cm when a specimen of the material is tested under the standard ASTM D-256 (⅛" notched) at 23° C.

In some embodiments, the composite material has tensile strength of greater than or equal to about 430 kgf/cm² when a specimen of the material is tested under the standard ASTM D638 (5 mm/min). In some embodiments, the composite material has tensile strength of greater than or equal to about 460 kgf/cm² when a specimen of the material is tested under the standard ASTM D638 (5 mm/min). In some embodiments, the composite material has tensile strength of greater than or equal to about 490 kgf/cm² when a specimen of the material is tested under the standard ASTM D638 (5 mm/min).

In other embodiments, the composite material has flexural modulus of greater than or equal to about 24000 Kgf/cm² when a specimen of the material is tested under the standard ASTM D790 (¼"). In some embodiments, the composite material has flexural modulus of greater than or equal to about 24500 Kgf/cm² when a specimen of the material is tested under the standard ASTM D790 (¼"). In some embodiments, the composite material has flexural modulus of greater than or equal to about 25000 Kgf/cm² when a specimen of the material is tested under the standard ASTM D790 (¼").

In some embodiments, the composite material has Heat Distortion Temperature of greater than or equal to about 82° C. when a specimen of the material is tested under the standard ASTM D648 (¼", 120° C./hr) under 18.5 kgf/cm² load. In other embodiments, the composite material has Heat Distortion Temperature of greater than or equal to about 85° C. when a specimen of the material is tested under the standard ASTM D648 (¼", 120° C./hr) under 18.5 kgf/cm² load.

One embodiment includes a molded article comprising the composite material of as herein described. Another embodiment includes an electronic device comprising the composite material as herein described.

One embodiment includes a method of forming a nanocomposite material comprising providing metal (oxide) nanoparticles, wherein the metal (oxide) nanoparticles comprise an organic functional group, and graft polymerizing a vinyl polymer onto the metal (oxide) nanoparticles. In certain of these embodiments, providing metal (oxide) nanoparticles comprises forming the metal (oxide) nanoparticles by surface treating a metal (oxide) particle having at least one hydroxyl group with an alkoxysilane compound in a sol-gel process.

The composite materials as herein described may be mixed, extruded, or molded into a desired shape. As such, one method includes mixing the graft polymerized nanoparticles with a thermoplastic resin to form a mixture, and molding the mixture into a shape.

DETAILED DESCRIPTION OF THE PREFERRED EMBODIMENT

Figure 1:
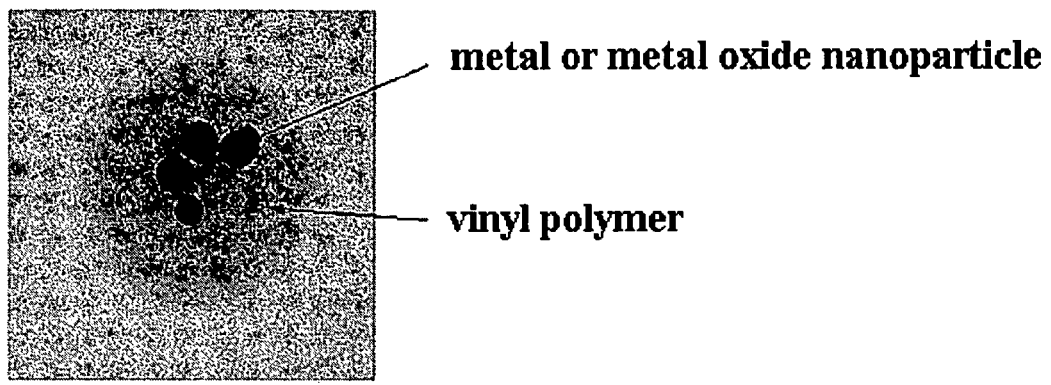
FIG. 1 is a transmission electron micrograph (TEM) of a vinyl copolymer/metal oxide nanocomposite obtained in Example 2.

As noted above, one aspect of this invention relates to a polymer composite material. According to various embodiments, the polymer composite material comprises a vinyl polymer and nanoparticles. In some embodiments, the nanoparticles are metal (oxide) nanoparticles. In some particular embodiments, the metal (oxide) nanoparticles have been modified to be chemically bonded to the vinyl polymer. Additional embodiments of the composite material also comprise a thermoplastic resin. Shaped articles comprising the composite material of the embodiments show enhanced physical or mechanical properties as compared to other composite materials less one or more components. The shaped articles of the embodiments also demonstrate improved impact strength, tensile strength, flexural modulus, and heat distortion temperatures over composite materials less one or more components.

Thus, one advantage according to some embodiments is improved heat resistance, tensile strength, flexural modulus and scratch resistance, while maintaining the intrinsic properties of the thermoplastic resin such as transparency, moldability and impact strength.

In embodiments, a composite material comprises a vinyl polymer and metal or metal oxide nanoparticles. In some embodiments, at least a portion of the nanoparticles are chemically bonded to the one or more vinyl polymers. In addition, some embodiments of the composite material additionally comprise a thermoplastic resin, such as a rubber-modified graft copolymer. In certain embodiments, the composite material comprises about 1 to about 99 parts by weight of the thermoplastic resin and about 100 parts by weight of the nanoparticle/vinyl polymer moiety. These components are further described herein.

Organo-Modified Metal (Oxide) Nanoparticles

According to certain embodiments, a composite material comprises metal (oxide) nanoparticles and a vinyl polymer. In some particular embodiments, the metal (oxide) nanoparticles are modified to have a functional group to which the vinyl polymer may be graft polymerized. Such metal or metal oxide nanoparticle may be formed by surface-treating a colloidal metal or metal oxide having at least one hydroxyl group with an alkoxysilane compound having a functional group. According to some embodiments, these modified metal (oxide) nanoparticles may be prepared according to a sol-gel method.

For example, colloidal metal (oxide) nanoparticles may undergo a sol-gel reaction with an alkoxysilane compound having at least one organic functional group. This process employs the use of alkoxide precursor solutions to provide an inorganic oxide or an organic/inorganic hybrid nanocomposite. According to one process, an organo-silicone alkoxide having a chemical structure of $R_xSi(OR)_y$ can be utilized to prepare organo-modified colloidal metal (oxide) nanoparticle.

The alkoxy group of the alkoxide precursor may form a network structure by hydrolysis and condensation reactions under a sol-gel process. The following formulas are examples of a silica forming sol gel process:

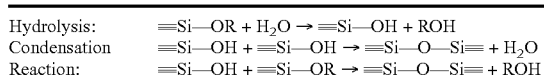

| Hydrolysis: | ≡Si—OR + H₂O → ≡Si—OH + ROH |
| Condensation | ≡Si—OH + ≡Si—OH → ≡Si—O—Si≡ + H₂O |
| Reaction: | ≡Si—OH + ≡Si—OR → ≡Si—O—Si≡ + ROH |

The sol-gel process may be initiated and controlled by the addition of water and acid or base catalyst to an alcohol solution of the precursor. In a stage where an oxide oligomer containing organic residue is dispersed in a molecular state, the solution is in a state of "sol". As the reaction proceeds, a silica network is formed, thereby the viscosity of the solution is increased, losing its fluidity, called a "gel". The sol state can be transformed into the gel state as a reaction progresses, called a "sol-gel process". Alternatively, other metal alkoxides having a metal of Si, Ti, Zr, Al, etc., may also be used to introduce other metals to an inorganic network or to increase cross-linking of the silica network. In some embodiments, hardness, refractive index and porosity of the metal (oxide) nanoparticles can be adjusted by using a heterogeneous metal alkoxide by itself or in combination with other metal alkoxides including alkoxysilanes.

In one embodiment, metal (oxide) nanoparticles, each having at least one hydroxyl group on its surface may be treated by the above described sol-gel process. The at least one surface hydroxyl group of a metal (oxide) nanoparticle reacts with the alkoxysilane compound having a functional group. This produces a bond between the metal (oxide) nanoparticle and the alkoxysilane compound. In some embodiments, the silicon metal bonds to the colloidal metal or metal oxide nanoparticle, through an oxygen atom. In some embodiments, this organo-modified metal (oxide) nanoparticle inhibits the aggregation of the metal (oxide) nanoparticles because the modified metal (oxide) nanoparticles is highly hydrophobic. In some embodiments, this is advantageous because the modified metal (oxide) nanoparticle acts as a seed during graft polymerization of the vinyl polymer to the nanoparticle.

In some embodiments, the resulting silica and other metal (oxide) content of the surface-modified metal (oxide) nanoparticle may be about 75-99% by weight, and the content of the organic functional group of the modified nanoparticle may be about 1-25% by weight. The colloidal nanoparticles may be surface-treated according to the following procedure:

One or more of the metal (oxide) nanoparticles may be dispersed in water and diluted by adding the same amount of an alcohol and stirred. An alkoxysilane compound is slowly added to the dilute colloidal solution of metal (oxide) nanoparticles using a dropping apparatus with vigorous stirring. The resultant reaction mixture is subjected to vacuum at 60° C. to remove alcohols produced from the hydration reaction of the sol-gel process. After removing the alcohols, the resultant reaction mixture is heated to 80° C. and subjected to a post-stirring to minimize unreacted reactants.

Suitable colloidal metal (oxide) nanoparticles prior to modification include, but are not limited to, silicon dioxide ($SiO_2$), aluminum oxide ($Al_2O_3$), titanium dioxide ($TiO_2$), tin oxide ($SnO_2$), iron oxide ($Fe_2O_3$), zinc oxide ($ZnO$), magnesium oxide ($MgO$), zirconium oxide ($ZrO_2$), cerium oxide ($CeO_2$), lithium oxide ($Li_2O$), silver oxide ($AgO$), antimony oxide ($Sb_2O_3$); silver (Ag), nickel (Ni), magnesium (Mg), zinc (Zn).

In some embodiments, the colloidal metal or metal oxide nanoparticle has an average particle size from about 5 nm to about 300 nm, preferably from about 5 nm to about 100 nm. In one embodiment, the colloidal metal or metal oxide nanoparticle is a water-dispersed colloid having a pH range from about 1-12, preferably about 1-5. In one embodiment, the colloidal metal or metal oxide nanoparticle is stabilized with an alkali having a pH of about 8-11. In another embodiment, the colloidal metal or metal oxide nanoparticle is stabilized with an acid having a pH range of about 1-5.

The alkoxysilane compound may contain a hydrolytic silane residue and at least one organic residue. In some embodiments, the alkoxysilane compound is one or more selected from the group consisting of acryloxyalkyltrimethoxysilane, methacryloxyalkyltrimethoxysilane, methacryloxyalkyltriethoxysilane, vinyltrimethoxysilane, vinyltriethoxysilane, methyltrimethoxysilane, methyltriethoxysilane, propyltrimethoxysilane, perfluoroalkyltrialkoxysilane, perfluoromethylalkyltrialkoxysilane, glycidyloxyalkyltrimethoxysilane, aminopropyltrimethoxysilane, aminopropyltriethoxysilane, aminoethyltrimethoxysilane, aminopropyltrimethoxysilane, mercaptopropyltrimethoxysilane, mercaptopropyltriethoxysilane, mercaptopropylmethyldiethoxysilane, mercaptopropyldimethoxymethylsilane, mercaptopropylmethoxydimethylsilane, mercaptopropyltriphenoxysilane, and mercaptopropyltributoxysilane.

Vinyl Polymer

As discussed above, according to some embodiments, a composite material comprises metal (oxide) nanoparticles and a vinyl polymer. In certain embodiments, the vinyl polymer is a polymer of one or more monomers selected from the group consisting of an aromatic vinyl monomer, a vinyl cyanide monomer, and an acrylic monomer.

Suitable aromatic vinyl monomer include, but are not limited to, styrene, α-methylstyrene, β-methylstyrene, o-methylstyrene, m-methylstyrene, p-methylstyrene, o-ethylstyrene, m-ethylstyrene, p-ethylstyrene, o-tert-butylstyrene, m-tert-butylstyrene, p-tert-butylstyrene, o-chlorostyrene, m-chlorostyrene, p-chlorostyrene, dichlorostyrene, o-bromostyrene, m-bromostyrene, p-bromostyrene, dibromostyrene, vinyl toluene, vinyl xylene, vinyl naphthalene, and divinylbenzene. Combinations of any of the foregoing monomers may also be used.

Suitable vinyl cyanide monomers include, but are not limited to, acrylonitrile, methacrylonitrile, and ethacrylonitrile. Combinations of any of the foregoing monomers may also be used.

Suitable acrylic monomers include, but are not limited to, methacrylic acid esters such as methyl methacrylate, ethyl methacrylate, propyl methacrylate, butyl methacrylate, benzyl methacrylate; one or more acrylic acid esters such as methyl acrylate, ethyl acrylate, propyl acrylate, n-butyl acrylate, 2-ethylhexyl acrylate; one or more unsaturated carboxylic acids such as acrylic acid, methacrylic acid, maleic anhydride; one or more esters containing hydroxy-group such as 2-hydroxyethylacrylate, 2-hydroxypropylacrylate, monoglycerol acrylate; and one or more acrylic acid derivatives such as acrylamide, methacrylamide. The acrylic monomer may also be a combination of two or more acrylic monomers as described above.

An additional monomer may be copolymerized with one or more of the above mentioned monomers. In some embodiments, this additional monomer is an imide monomer that is copolymerizable with one or more of the above mentioned monomers. In some embodiments, a suitable imide monomer includes one or more of maleimide, N-methyl maleimide, N-phenyl maleimide and acrylimide.

In some embodiments, the vinyl polymer is a polymer of about 20 to about 100 parts by weight of a monomer selected from the group consisting of the aromatic vinyl monomer, the vinyl cyanide monomer, and the acrylic monomer, or any combination thereof, and about 0 to 80 parts by weight of the imide monomer that copolymerizable with the aromatic vinyl monomer, the vinyl cyanide monomer, or the acrylic monomer.

In some embodiments, the composite material comprises about 100 parts by weight of the vinyl polymer and about 0.1 to about 50 parts by weight of the organo-modified colloidal metal (oxide) nanoparticles. In some embodiments, the composite material comprises about 0.1, 0.5, 1, 1.5, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 and 50 parts by weight of the modified metal(oxide) nanoparticles based on 100 parts by weight of the vinyl polymer.

Preparation of the Nanoparticles Grafted with the Vinyl Polymer

One aspect includes a method of preparing a nanocomposite material. In some embodiments, a method of preparing a nanocomposite material comprises providing organo-modified metal (oxide) nanoparticles and graft polymerizing the vinyl polymer onto the metal (oxide) nanoparticles. In some of these embodiments, the organo-modified metal (oxide) nanoparticles can be prepared by surface treating a metal (oxide) particle having at least one hydroxyl group with an alkoxysilane compound in a sol-gel process. This method is further described herein.

In some embodiments, it is advantageous to substantially have uniform dispersion of the nanoparticles in the vinyl polymer. As the modification of the metal oxide nanoparticle increases their hydrophobicity, the nanoparticle may be uniformly dispersed in the vinyl polymer.

In some embodiments, the graft-polymerization is conducted according to emulsion polymerization or suspension polymerization. In one embodiment, water (treated by ion exchange to remove any metals), molecular weight regulating agent and emulsifying agent are added to about 10-50 parts by weight of the vinyl compound, and the temperature of the mixture is elevated with stirring. After raising the temperature to about 55-65° C., about 0.1-50 parts by weight of the organo-modified colloidal metal (oxide) nanoparticles is added. About 5-30 minutes later, a polymerization initiator is added to commence a polymerization reaction. Starting from the initiation of the polymerization reaction, reaction temperature may be raised. When the internal temperature of the reactor reaches about 75-80° C., the reaction continues for about 30-90 minutes at about 75-80° C. to maintain the conversion rate of at least 95%.

Thereafter, the polymerization initiator is further introduced to the reactor, followed by stirring for about 5-10 minutes while maintaining the temperature of about 75-80° C. Then, 50-90 parts by weight of residual vinyl polymer and a molecular weight regulating agent are continuously added for about 2-5 hours.

After completing the addition of the vinyl polymer (or its selective monomer units), the reaction continues for about 30-60 minutes at 75-80° C. When conversion rate reaches to about 93-98%, the polymerization reaction is allowed to terminate by cooling to obtain the composite material having about 30-45% by weight of solid components.

Examples of polymerization initiators include, but are not limited to, acetyl cyclohexyl sulfonyl peroxide, 2,2'azobis-2, 4-dimethylvaleronitrile, 2,2'-azobis(2-amidinopropane) dihydrochloride, lauroyl peroxide, 2-2'-azobisisobutyronitrile, benzoyl peroxide, dimethyl-2,2'-azobisisobutyronitrile, 4,4'-azobis-4-cyanovaleric acid, potassium persulfate, sodium persulfate, ammonium persulfate. In embodiments, the amount of the polymerization initiator is from about 0.1 to about 1.5 parts by weight.

Examples of the emulsifying agent include, but are not limited to, fatty acid metal salts such as sodium laurylate, sodium oleate, potassium oleate, potassium stearate, sodium laurylsulfate, potassium salt of rosin acid and so forth. Among them, potassium stearate or potassium salt of rosin acid is preferred. These emulsifying agents may be used alone or in combination of two or more thereof. In embodiments, the amount of the emulsifying agent is from about 1.0 to about 10 parts by weight.

Examples of the molecular weight regulating agent (i.e., chain transfer agent) include, but are not limited to, $C_{8-18}$ mercaptan, organic halogen compound, α-methyl styrene dimer, terpinolene, and α-terpinolene. These molecular weight regulating agents may be used alone or in combination of two or more thereof. The amount of the molecular weight regulating agent is from about 0.1 to about 1.0 parts by weight.

Thermoplastic Resin Composite Materials

As described above, the composite material may further comprise a thermoplastic resin. In some embodiments, the thermoplastic resin is a rubber-modified graft copolymer. Examples of suitable thermoplastic resins that can be used in combination with the vinyl polymer/metal (oxide) nanocomposite moiety includes, but is not limited to, acrylonitrile-butadiene-styrene copolymer (ABS), acrylonitrile-acrylic rubber-styrene copolymer resin (AAS), acrylonitrile-ethylenepropylene rubber-styrene copolymer resin, acrylonitrile-styrene copolymer resin (SAN).

In one embodiment, the rubber-modified graft copolymer may be obtained by graft polymerizing about 25 to about 70 parts by weight of a rubber polymer, about 40 to about 90 parts by weight of an aromatic vinyl compound and about 10 to about 60 parts by weight of a vinyl cyanide compound. In some embodiments, the rubber polymer includes, but is not limited to, one or more of diene rubber, ethylene rubber, ethylene/propylene/diene terpolymer (EPDM). In some embodiments, the aromatic vinyl monomer includes, but is not limited to, one or more of styrene, α-methylstyrene, β-methylstyrene, o-, m-, or p-methylstyrene, o-, m-, or p-ethylstyrene, o-, m- or p-t-butylstyrene, o-, m- or p-chlorostyrene, dichlorostyrene, o-, m- or p-bromostyrene, dibromostyrene, vinyl toluene, vinyl xylene, vinyl naphthalene, divinylbenzene. In some embodiments, the vinyl cyanide compound includes, but is not limited to, acrylonitrile, methacrylonitrile, ethacrylonitrile and mixtures thereof.

In some embodiments, the composite material comprises about 100 parts by weight of the vinyl polymer/metal (oxide) nanocomposite moiety and about 1 to about 99 parts by weight of a thermoplastic resin. In other embodiments, the composite material comprises about 60 to about 90 parts by weight of the vinyl polymer/metal (oxide) nanocomposite moiety and about 10-40 parts by weight of the thermoplastic resin.

Additional Components

Composite material mixtures may additionally comprise one or more other additives such as surfactants, nucleating agents, coupling agents, fillers, plasticizers, impact modifiers, heat-stabilizers, antioxidants, release agents, ultraviolet absorbing agents, light stabilizers, flame retardants, lubricants, colorants such as dyes and pigments, antistatic agents, flame retardants and small amounts of various polymers. The composite materials can contain one or more compounds or polymers in addition to the foregoing components. Additional components or additives may be added to provide additional properties or characteristics to the composite material or to modify existing properties of the composite material. One of ordinary skill in the art will appreciate that various additives may be added to the composite materials according to some embodiments.

Properties of the Composite Materials

An advantage of certain embodiments is to provide a thermoplastic resin composite material with improved physical and mechanical properties. Such properties include, but are not limited to, flexural strength, impact strength, tensile strength, and heat resistance.

Some embodiments comprising metal (oxide) nanoparticles, a vinyl polymer chemically bonded to the metal (oxide) nanoparticles, and a thermoplastic resin in which the nanoparticles are dispersed have impact strength of great than or equal to about 21 kgf·cm/cm, more preferably greater than or equal to about 22 kgf·cm/cm, and even more preferably greater than or equal to about 23 kgf·cm/cm, when a specimen of the composite material is tested according to the standard ASTM D256 (¼" notched) at 23° C.

Some embodiments comprising metal (oxide) nanoparticles, a vinyl polymer chemically bonded to the metal (oxide) nanoparticles, and a thermoplastic resin in which the nanoparticles are dispersed have impact strength of greater than or equal to about 24 kgf·cm/cm, more preferably greater than or equal to about 24 kgf·cm/cm, and even more preferably greater than or equal to about 27 kgf·cm/cm, when a specimen of the composite material is tested according to the standard ASTM D256 (1/8" notched) at 23° C.

Some embodiments comprising metal (oxide) nanoparticles, a vinyl polymer chemically bonded to the metal (oxide) nanoparticles, and a thermoplastic resin in which the nanoparticles are dispersed have a tensile strength of greater than or equal to about 430 kgf/cm$^2$, more preferably greater than or equal to about 460 kgf/cm$^2$, and even more preferably greater or equal to about 490 kgf/cm$^2$ when a specimen of the material is tested under the standard ASTM D638 (5 mm/min).

Some embodiments comprising metal (oxide) nanoparticles, a vinyl polymer chemically bonded to the metal (oxide) nanoparticles, and a thermoplastic resin in which the nanoparticles are dispersed have flexural modulus of greater than or equal to about 24000 Kgf/cm$^2$, more preferably greater than or equal to about 24500 Kgf/cm$^2$, or even more preferably greater than or equal to about 25000 Kgf/cm$^2$ when a specimen of the material is tested under the standard ASTM D790 (1/4").

Some embodiments comprising metal (oxide) nanoparticles, a vinyl polymer chemically bonded to the metal (oxide) nanoparticles, and a thermoplastic resin in which the nanoparticles are dispersed have a Heat Distortion Temperature of greater than or equal to about 82° C., more preferably greater than or equal to about 85° C., or even more preferably greater than or equal to about 86° C., when a specimen of the material is tested under the standard ASTM D648 (1/4", 120° C./hr) under 18.5 kgf/cm$^2$ load.

Shaped Articles

A shaped article can be made using the composite material according to the foregoing embodiments. In some embodiments, this article is molded into various shapes. An extrusion molding machine such as a vented extruder may be used. The polymer composite material of embodiments may be molded into various moldings using, for example, a melt-molding device. In embodiments, the polymer composite material is formed into a pellet, which then may be molded into various shapes using, for example, injection molding, injection compression molding, extrusion molding, blow molding, pressing, vacuum forming or foaming. In one embodiment, the polymer composite material can be made into a pellet using melt-kneading, and the resulting pellets are molded into moldings through injection molding or injection compression molding.

As noted, in one embodiment, the polymer composite materials are formed into pellets. In other embodiments, the polymer composite materials are formed into structural parts of various consumer products, including electronic devices and appliances. In some embodiments, the polymer composite materials are molded into a housing or body of electronic or non-electronic devices. Examples of electrical devices, in which a molded article made of the blend of the composite material according to embodiments of the invention are used, include printers, computers, word processors, keyboards, personal digital assistants (PDA), telephones, mobile phones, cameras, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

Another embodiment provides an electronic device which includes a housing or a part, which is made of a polymer composite material comprising a composite material as herein described. Some embodiments provide a method of making an electronic device, comprising providing an electrical circuit, providing a housing comprising a portion, and enclosing at least part of the electrical circuit with the housing, wherein the portion comprises embodiments of the composite material as herein described.

The invention is further described in terms of the following examples which are intended for the purpose of illustration and not to be construed as in any way limiting the scope of the present invention, which is defined by the claims. In the following examples, all parts and percentage are by weight unless otherwise indicated.

EXAMPLES

Each component of (A) rubber-modified graft copolymer, (B) colloidal metal or metal oxide nanoparticles, (C) polymerizable silane compound, (D) surface-modified colloidal metal or metal oxide nanoparticles, (E) vinyl copolymer/ metal or metal oxide nanoparticle composite, (F) SAN copolymer and (G) fumed silica was prepared as follows:

(A) Thermoplastic Resin

For the thermoplastic resin a rubber-modified graft copolymer was prepared using 50 parts by weight of polybutadiene, 15 parts by weight of acrylonitrile and 35 parts by weight of styrene.

(B) Colloidal Metal (Oxide) Nanoparticles ($B_1$) Colloidal silica sol having an average particle size of 20 nm and a pH range of 1-4 was used.

($B_2$) Colloidal silica sol having an average particle size of 40-60 nm and a pH range of 1-4 was used.

(C) Polymerizable Silane Compound

Methacryloxyalkyltrimethoxysilane was used. This is available from GE Silicone/OSi Specialties Co. (New York) as Silquest A-174.

(D) Surface-Modified Colloidal Metal or Metal Oxide Nanoparticles ($D_1$) 10 parts by weight of the polymerizable silane compound (C) was added to 90 parts by weight of the colloidal silica nanoparticles ($B_1$), followed by subjection to a sol-gel reaction to obtain surface-modified colloidal silica nanoparticles.

($D_2$) 10 parts by weight of the polymerizable silane compound (C) was added to 90 parts by weight of the colloidal silica nanoparticles ($B_2$), followed by subjection to a sol-gel reaction to obtain surface-modified colloidal silica nanoparticles.

(E) Vinyl Copolymer/Metal or Metal Oxide Nanoparticle Composite ($E_1$) 10 parts by weight of acrylonitrile, 20 parts by weight of styrene, 0.3 parts by weight of potassium persulfate ($K_2S_2O_8$), 0.06 parts by weight of maleic anhydride and 1.5 parts by weight of the surface-modified colloidal silica nanoparticles ($D_1$) were added to a reactor and mixed. The mixture was polymerized at 75-80° C. for 15 minutes. Then, 20 parts by weight of acrylonitrile, 50 parts by weight of styrene and 0.14 parts by weight of maleic anhydride were added continuously and polymerized for 2 hours to reach the polymerization conversion rate of 95%, followed by devolatilization process to obtain a vinyl copolymer/metal (oxide) nanoparticle composite.

($E_2$) Nanoparticle composite was prepared in the same manner as the nanoparticle composite ($E_1$) except that 5 parts by weight of the surface-modified colloidal silica nanoparticles ($D_1$) was used.

($E_3$) Nanoparticle composite was prepared in the same manner as the nanoparticle composite ($E_1$) except that 10 parts by weight of the surface-modified colloidal silica nanoparticles ($D_1$) was used.

($E_4$) Nanoparticle composite was prepared in the same manner as the nanoparticle composite ($E_1$) except that 1.5 parts by weight of the surface-modified colloidal silica nanoparticles ($D_2$) was used.

($E_5$) Nanoparticle composite was prepared in the same manner as the nanoparticle composite ($E_1$) except that 50 parts by weight of the surface-modified colloidal silica nanoparticles ($D_2$) was used.

($E_6$) Nanoparticle composite was prepared in the same manner as the nanoparticle composite ($E_1$) except that 10 parts by weight of the surface-modified colloidal silica nanoparticles ($D_2$) was used.

(F) Copolymer of Vinyl Cyanide Compound And Aromatic Vinyl Compound (SAN Copolymer)

SAN copolymer polymerized with 30 parts by weight of acrylonitrile and 70 parts by weight of styrene, and having a weight average molecular weight of 120,000 was used.

(G) Fumed Silica (not Colloidal Silica)

Fumed silica having an average particle size of 5-20 nm manufactured by Degussa company (product name: AEROSIL® R 974) was used.

Examples 1-6

Figure 2:
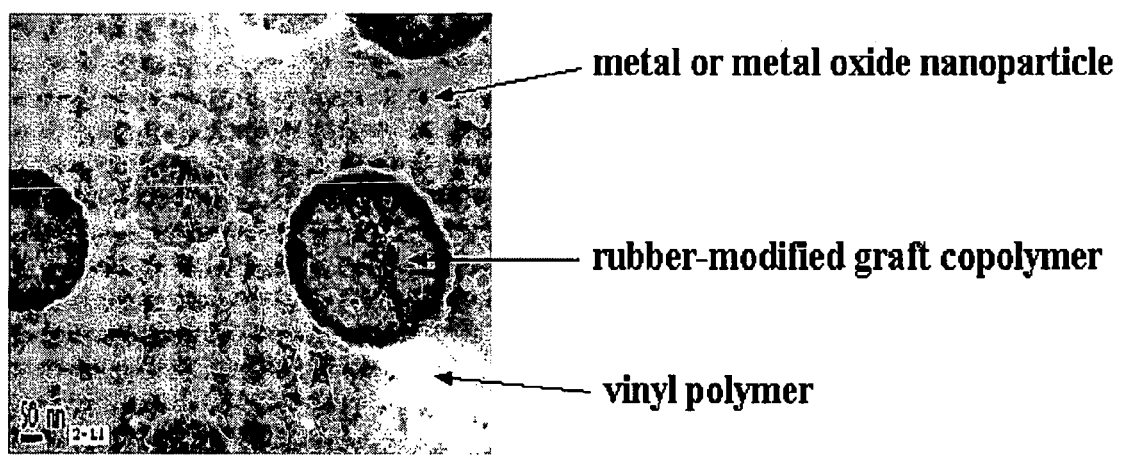
FIG. 2 is a transmission electron micrograph (TEM) of a thermoplastic nanocomposite resin obtained in Example 2.
Figure 3:
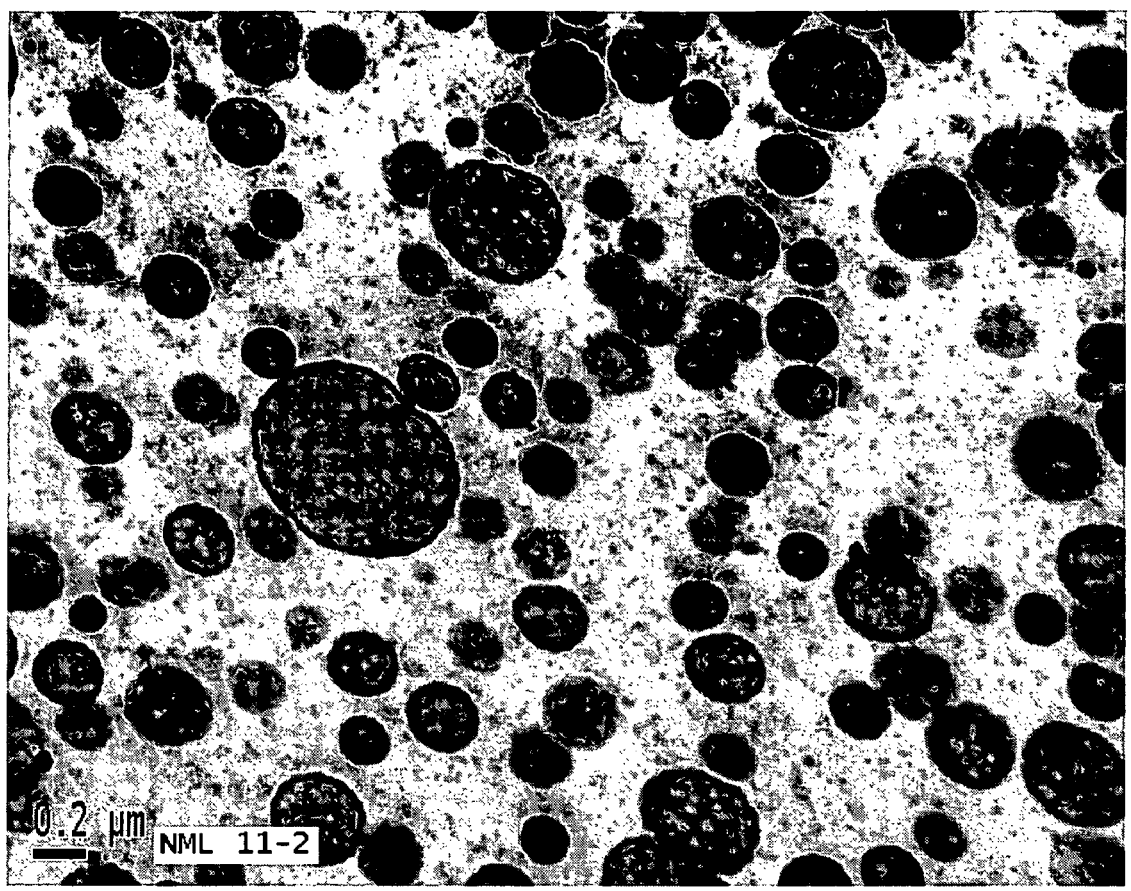
FIG. 3 is a transmission electron micrograph (TEM) of a thermoplastic nanocomposite resin obtained in Example 3.

The components as shown in Table 1 were mixed and the mixture was melted and extruded through a twin screw extruder with L/D=29 and F=45 mm in pellets. The cylinder temperature of the extruder was kept at 220° C. The pellets were dried at 80° C. for 6 hours. The dried pellets were molded into test specimens using a 6 oz injection molding machine at molding temperature of 240-280° C., and barrel temperature of 60-80° C. The transmission electron micrographs (TEM) of the thermoplastic nanocomposite resins obtained in Examples 2 and 3 are shown in FIGS. 2 and 3 respectively. As shown in FIGS. 2 and 3, the nanoparticles are uniformly dispersed throughout the matrix. FIG. 1 is a transmission electron micrograph (TEM) of a vinyl copolymer/metal oxide nanocomposite obtained in Example 2.

Comparative Example 1

Comparative Example 1 was conducted in the same manner as in Example 1 except that the copolymer of cyanide vinyl compound and aromatic vinyl compound (F) was used instead of the vinyl copolymer/metal oxide nanocomposite (E).

Comparative Examples 2-4

Comparative Examples 2~4 were conducted in the same manner as in Comparative Example 1 except that the fumed silica nanoparticle (G) was added.

TABLE 1

|  |  | (A) g-ABS resin | (E) nanoparticle composite | | | | | | (G) fumed silica | (F) SAN copolymer |
|---|---|---|---|---|---|---|---|---|---|---|
|  |  |  | ($E_1$) | ($E_2$) | ($E_3$) | ($E_4$) | ($E_5$) | ($E_6$) |  |  |
| Example | 1 | 25 | 75 | — | — | — | — | — | — | — |
|  | 2 | 25 | — | 75 | — | — | — | — | — | — |
|  | 3 | 25 | — | — | 75 | — | — | — | — | — |
|  | 4 | 25 | — | — | — | 75 | — | — | — | — |
|  | 5 | 25 | — | — | — | — | 75 | — | — | — |
|  | 6 | 25 | — | — | — | — | — | 75 | — | — |
| Comparative Example | 1 | 25 | — | — | — | — | — | — | — | 75 |
|  | 2 | 25 | — | — | — | — | — | — | 1.0 | 75 |
|  | 3 | 25 | — | — | — | — | — | — | 3.5 | 75 |
|  | 4 | 25 | — | — | — | — | — | — | 7 | 75 |

The physical properties of the test specimens of Examples 1-6 and Comparative Examples 1-4 were measured as follow:

(1) Notch Izod Impact Strength: The notch Izod impact strength was measured in accordance with ASTM D256 (¼", ⅛", 23° C.).

(2) Tensile Strength: The tensile strength was determined in accordance with ASTM D638 (5 mm/min).

(3) Flexural Modulus: The flexural modulus was measured in accordance with ASTM D790 (¼").

(4) Heat Distortion Temperature (HDT): The heat distortion temperature was measured according to ASTM D648 (¼", 120° C./hr) under 18.5 kgf/cm².

The test results are shown in Table 2.

TABLE 2

|  |  | Notch Izod Impact Strength (Kgf · cm/cm) | | Tensile Strength (Kgf/cm²) | Flexural Modulus (Kgf/cm²) | HDT (° C.) |
|---|---|---|---|---|---|---|
|  |  | ¼" | ⅛" |  |  |  |
| Example | 1 | 23 | 26 | 430 | 24100 | 82 |
|  | 2 | 22 | 25 | 446 | 24900 | 85 |
|  | 3 | 21 | 24 | 498 | 25400 | 86 |
|  | 4 | 23 | 27 | 436 | 24300 | 82 |
|  | 5 | 22 | 26 | 457 | 24700 | 85 |
|  | 6 | 22 | 25 | 488 | 25100 | 86 |
| Comparative Example | 1 | 22 | 25 | 426 | 23630 | 80 |
|  | 2 | 20 | 21 | 354 | 22000 | 80 |
|  | 3 | 18 | 19 | 346 | 21500 | 81 |
|  | 4 | 16 | 20 | 337 | 20700 | 81 |

As shown in Table 2, the thermoplastic nanocomposite resin composite materials according to some embodiments show excellent tensile strength, flexural modulus and heat resistance compared to those not employing vinyl copolymer/metal or metal oxide nanoparticle composite. The resin composite materials of Comparative Examples 2-4 in which rubber-modified graft copolymer, fumed silica and SAN copolymer were blended without using the in-situ method show that impact strength, tensile strength, flexural modulus and heat resistance were all degraded. It can be seen that the physical properties of the thermoplastic nanocomposite resin composite materials may be easily controlled by adjusting the size and amount of the organo-modified metal or metal oxide nanoparticles.

The skilled artisan will recognize the interchangeability of various features from different embodiments. Similarly, the various features and steps discussed above, as well as other known equivalents for each such feature or step, can be mixed and matched by one of ordinary skill in this art to perform composite materials or methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein. Rather, the scope of the present invention is to be interpreted with reference to the claims that follow.

What is claimed is:

1. A composite material comprising:
   surface treated metal or metal oxide nanoparticles selected from the group consisting of silicon, aluminum, tin, iron, zinc, magnesium, zirconium, cerium, lithium, silver, antimony and nickel having a sol-gel network structure and comprising a condensed alkoxysilane compound reacted with the metal or metal oxide nanoparticles, wherein the condensed alkoxysilane compound further includes a functional group that is capable of bonding with a vinyl polymer, and wherein said metal or metal oxide nanoparticles comprise about 75 to 99% by weight of said metal or metal oxide and about 1 to 25% by weight of said alkoxysilane compound;
   a vinyl polymer of one or more monomers selected from the group consisting of aromatic vinyl monomers, vinyl cyanide monomers, and acrylic monomers;
   wherein the functional group of the condensed alkoxysilane compound is bonded with the vinyl polymer and wherein the functional group of the polymerizable alkoxysilane compound comprises an acryloxy functional group or a methacryloxy functional group.

2. The composite material of claim 1, wherein the vinyl polymer is grafted on the surface of the metal or metal oxide nanoparticles.

3. The composite material of claim 1, wherein the metal or metal oxide nanoparticles are colloidal metal or metal oxide nanoparticles.

4. The composite material of claim 1, the composite material comprising a graft polymer of the vinyl polymer and the metal or metal oxide nanoparticles.

5. The composite material of claim 1, wherein the vinyl polymer is a copolymer of a) one or more of the aromatic vinyl monomer, the vinyl cyanide monomer, and the acrylic monomer, and b) an imide.

6. The composite material of claim 5, wherein the imide is one or more selected from the group consisting of maleimide, N-methyl maleimide, N-phenyl maleimide and acrylimide.

7. The composite material of claim 1, wherein the metal or metal oxide nanoparticles are nanoparticles of a sol-gel product of colloidal silica and methacryloxyalkyltrimethoxysilane.

8. A molded article comprising the composite material of claim 1.

9. An electronic device comprising the composite material of claim 1.

10. The composite material of claim 1, wherein the vinyl polymer is graft polymerized to the surface of the metal or metal oxide nanoparticles through the acryloxy functional group or a methacryloxy functional group.

11. A composite material comprising:
    surface treated metal or metal oxide nanoparticles selected from the group consisting of silicon, aluminum, tin, iron, zinc, magnesium, zirconium, cerium, lithium, silver, antimony and nickel having a sol-gel network structure and comprising a condensed alkoxysilane compound reacted with the metal or metal oxide nanoparticles, wherein the condensed alkoxysilane compound further includes a functional group that is capable of bonding with a vinyl polymer, wherein said metal or metal oxide nanoparticles comprise about 75 to 99% by weight of said metal or metal oxide and about 1 to 25% by weight of said alkoxysilane compound;
    a vinyl copolymer of (a) one or more monomers selected from the group consisting of aromatic vinyl monomers, vinyl cyanide monomers, and acrylic monomers and (b) one or more imides selected from the group consisting of maleimide, N-methyl maleimide, N-phenyl maleimide, and acrylimide;
    wherein the functional group of the condensed alkoxysilane compound is bonded with the vinyl polymer and wherein the functional group of the polymerizable alkoxysilane compound comprises an acryloxy functional group or a methacryloxy functional group.

12. The composite material of claim 11, wherein the vinyl polymer is grafted on the surface of the metal or metal oxide nanoparticles.

13. The composite material of claim 11, wherein the metal or metal oxide nanoparticles are colloidal metal or metal oxide nanoparticles.

14. The composite material of claim 11, wherein the metal or metal oxide nanoparticles are nanoparticles of a sol-gel product of colloidal silica and methacryloxyalkyltrimethoxysilane.

* * * * *